United States Patent [19]

Numata et al.

[11] 4,095,243
[45] June 13, 1978

[54] WARNING DEVICE FOR A CAMERA

[75] Inventors: Saburō Numata; Shin-ichirō Fujino, both of Ōmiya, Japan

[73] Assignee: Fuji Photo Optical Co., Ltd., Omiya, Japan

[21] Appl. No.: 667,071

[22] Filed: Mar. 15, 1976

[30] Foreign Application Priority Data

Mar. 19, 1975 Japan .............................. 50-32305

[51] Int. Cl.² .......................... G03B 7/00; G03B 17/20
[52] U.S. Cl. ................................ 354/60 L; 354/23 D; 354/53
[58] Field of Search ..................... 354/23 D, 53, 60 L, 354/60 A

[56] References Cited

U.S. PATENT DOCUMENTS

| | | | |
|---|---|---|---|
| 3,956,758 | 5/1976 | Numata et al. | 354/53 |
| 3,967,288 | 6/1976 | Yamamoto | 354/53 |

*Primary Examiner*—Russell E. Adams
*Attorney, Agent, or Firm*—Haseltine, Lake & Waters

[57] ABSTRACT

The warning device for a camera has an operation circuit for determining proper exposure condition of the shutter time according to the informations of the brightness of the object, the diaphragm aperture of the objective and the film sensitivity, a manually operable circuit for manually setting the condition of the shutter time and an optical indicating circuit operated by the manually operable circuit for digitally indicating the condition of the shutter time set by the manually operable circuit. The warning device comprises a coincidence detecting circuit with its inputs connected to the output of the operation circuit and the manually operable circuit, respectively, and with its output connected to one of the inputs of a gate circuit, and an oscillator with its output connected to the other input of the gate circuit, the output of the gate circuit being connected to the optical indicating circuit, thereby causing winking of the optical indication of the optical indicating circuit until the output of the manually operable circuit reaches that of the operation circuit.

3 Claims, 1 Drawing Figure

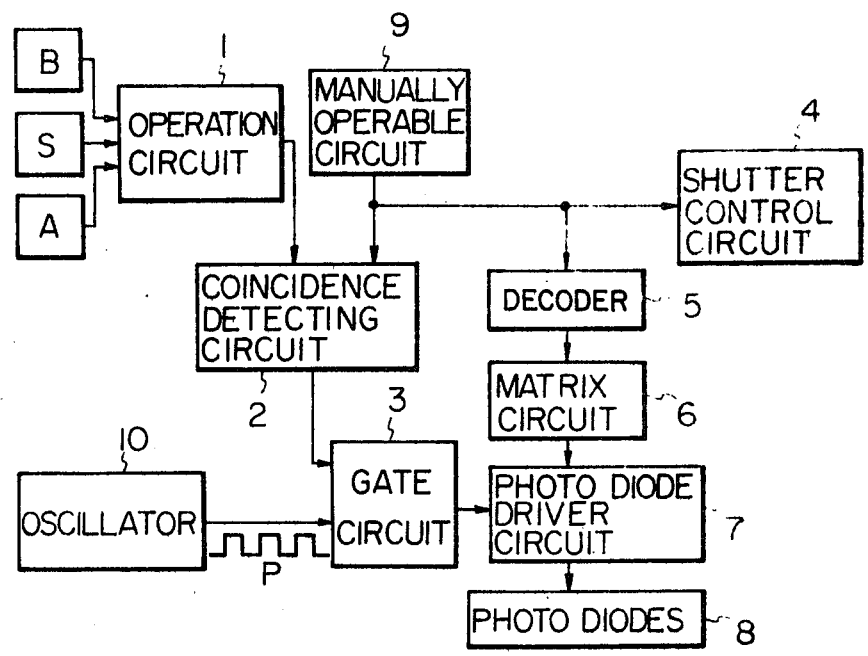

WARNING DEVICE FOR A CAMERA

BACKGROUND OF THE INVENTION

The present invention relates to a warning device for a camera.

It relates more particularly to a warning device adapted to be used in a camera provided with a digital indicating device of the shutter time manually set in the camera wherein winking of the optical indication of the digital indicating device is effected when the shutter time manually set in the camera does not coincide with that determined by an operation circuit provided in the camera on the basis of the informations of the brightness of the object, the diaphragm aperture of the objective of the camera and the sensitivity of the film loaded in the camera, while the winking of the optical indication is stopped to provide continuous optical indication when the manually set shutter time coincides with that determined by the operation circuit so that proper exposure condition is easily found out by the operator of the camera.

Various types of cameras have been recently proposed which are provided with digital indicating device for optically and digitally indicating informations relating exposure such as the proper shutter time obtained by the informations of the brightness of the object, the diaphragm aperture of the objective of the camera and the sensitivity of the film, a preset shutter time, the diaphragm aperture, or the exposure multiplication factor. Further, it has been proposed to utilize photo diodes in the digital indicating device so that warning against false exposure is provided by lighting and extinguishing the photo diodes. However, the prior art warning devices of the type described above issue warning by lighting or extinguishing the photo diodes only when the exposure condition as set is inappropriate so that false exposure might be caused, thereby resulting in poor effectiveness of the warning.

SUMMARY OF THE INVENTION

The object of the present invention is to provide a novel and useful warning device for a camera which avoids the above described disadvantages of the prior art warning devices.

In accordance with the present invention, the output of an operation circuit determining proper exposure information such as shutter time on the basis of informations of the brightness of the object, exposure information such as the diaphragm aperture of the objective and the sensitivity of the film is compared with the output of a manually operable circuit indicative of the shutter speed in a comparison circuit or a coincidence detecting circuit so that the output thereof is varied depending upon the difference between the outputs of the operation circuit and the manually operable circuit, the output of the coincidence detecting circuit being applied to a gate circuit to which an oscillator is also connected so that a driver circuit of the digital indicating device connected to the gate circuit is modulated by the output of the gate circuit which is opened when the output of the manually operable circuit reaches that of the operation circuit, thereby causing winking of the optical indication of the digital indicating device insofar as the output of the manually operable circuit does not coincide with that of the operation circuit, whereas, when the output of the manually operable circuit reaches the output of the operation circuit, the winking is stopped to give continuous optical indication of the proper exposure condition set in the camera.

BRIEF DESCRIPTION OF THE DRAWING

The accompanying drawing is a block diagram showing an embodiment of the electric circuit of the warning device of the present invention.

DETAILED DESCRIPTION OF THE PREFERRED EMBODIMENT

Referring to the accompanying drawings, an operation circuit 1 receives informations of the scene brightness or the brightness B of the object, the sensitivity S of the film loaded in the camera and exposure information such as the diaphragm aperture A of the objective of the camera and issues an output determining the proper shutter time. The output of the operation circuit 1 is supplied to one input of a coincidence detecting circuit 2. Another input of the coincidence detecting circuit 2 is connected to a manually operable circuit 9 which is also connected to a shutter control circuit 4 the time constant of which is controlled by the manually operable circuit 9 so as to manually set the shutter exposure information such as time in the camera.

The output of the manually operable circuit 9 is connected to a decoder 5 the output of which is connected to a matrix circuit 6. The output of the matrix circuit 6 is connected to a photo diode driver circuit of the output of which is connected to a photo diode assembly 8 so that the photo diode assembly 8 digitally indicates the exposure condition such as the shutter time manually set by the manually operable circuit 9 and the shutter control circuit 4.

In accordance with the present invention, the output of the coincidence detecting circuit 2 is connected to one input of a gate circuit 3 another input of which is connected to an oscillator 10 adapted to issue rectangular wave signals of the frequency P. The output of the gate circuit 3 is connected to the driver circuit 7 so as to render the digital indication of the photo diode assembly 8 to wink depending upon the condition of the coincidence detecting circuit 2 actuated by the outputs of the operation circuit 1 and the manually operable circuit 9 as described hereinafter.

In operation, when the manually operable circuit 9 is operated, the time constant of the shutter control circuit 4 is varied so that exposure information such as a shutter time is set in the camera according to the set condition of the manually operable circuit 9. At the same time, the photo diode assembly 8 is actuated through the decoder 5, the matrix circuit 6 and the driver circuit 7 so that exposure information such as the shutter time as set by the manually operable circuit 9 is digitally indicated by the photo diode assembly 8.

When the output of the manually operable circuit 9 indicative of the manually set shutter time does not coincide with the output of the operation circuit 1 indicative of the proper exposure time, the output of the coincidence detecting circuit 2 is made high level so that the gate circuit 3 passes the rectangular wave signal P from the oscillator 10 to the driver circuit 7 to modulate the same so that the digital indication of the manually set shutter time in the photo diode assembly 8 is rendered to wink at the frequency P.

When the output of the manually operable circuit 9 coincide with the output of the operation circuit 1 during the manual operation of the manually operable circuit 9, the output of the coincidence detecting circuit 2 is rendered to be low level, so that the gate circuit 3 is blocked to prevent the rectangular wave signal P from being applied to the driver circuit 7 thereby stopping the winking of the digital indication of the set shutter time in the photo diode assembly 8 to indicate the proper exposure condition of the camera.

We claim:

1. Warning device for a camera having an operation circuit for determining the proper exposure condition of exposure information such as the shutter time according to the informations of the brightness of the object, exposure information such as the diaphragm aperture of the objective and the film sensitivity, a manually operable circuit for manually setting the condition of the shutter time and an optical indicating circuit operated by the manually operable circuit for digitally indicating the condition of the shutter time set by said manually operable circuit, the improvement comprising: a coincidence detecting circuit with inputs connected to the output of the operation circuit and the manually operable circuit, respectively, a gate circuit, said coincidence detecting having an output connected to a first input of said gate circuit, and an oscillator with output connected to a second input of said gate circuit, the output of said gate circuit being connected to said optical indicating circuit, thereby causing blinking of the optical indication of said optical indicating circuit when the output of said manually operable circuit differs from that of said operation circuit, the optical indication of said optical indicating circuit being in a lighted state when the output of said manually operable circuit corresponding to the set shutter time coincides with the output of said operation circuit.

2. Device according to claim 1, wherein said optical indicating circuit comprises a decoder, a matrix circuit connected to said decoder, a photo diode driver circuit connected to said matrix circuit and a photo diode indicating assembly connected to said driver circuit, said decoder being connected to said manually operable circuit while said driver circuit is connected to said gate circuit.

3. A warning device for a camera as defined in claim 1 wherein said operation circuit includes light measuring means, said manually set shutter time being indicated by said indicating circuit so that said indicating circuits is in a lighted state at all times when the set shutter time coincides with the output of said light measuring means, said indicating circuit being in said blinking state when said shutter time differs from the output of said light measuring means.

* * * * *